US010552165B2

(12) United States Patent
Eisen et al.

(10) Patent No.: US 10,552,165 B2
(45) Date of Patent: *Feb. 4, 2020

(54) EFFICIENTLY MANAGING SPECULATIVE FINISH TRACKING AND ERROR HANDLING FOR LOAD INSTRUCTIONS

(71) Applicant: INTERNATIONAL BUSINESS MACHINES CORPORATION, Armonk, NY (US)

(72) Inventors: Susan E. Eisen, Round Rock, TX (US); David A. Hrusecky, Cedar Park, TX (US); Christopher M. Mueller, Pflugerville, TX (US); Dung Q. Nguyen, Austin, TX (US); A. James Van Norstrand, Jr., Round Rock, TX (US); Kenneth L. Ward, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 613 days.

This patent is subject to a terminal disclaimer.

(21) Appl. No.: 14/887,309

(22) Filed: Oct. 19, 2015

(65) Prior Publication Data

US 2017/0090937 A1    Mar. 30, 2017

Related U.S. Application Data

(63) Continuation of application No. 14/869,379, filed on Sep. 29, 2015.

(51) Int. Cl.
*G06F 9/38* (2018.01)
*G06F 9/30* (2018.01)
(Continued)

(52) U.S. Cl.
CPC .......... *G06F 9/3867* (2013.01); *G06F 9/3005* (2013.01); *G06F 9/3802* (2013.01);
(Continued)

(58) Field of Classification Search
CPC .... G06F 9/3867; G06F 9/3005; G06F 9/3802; G06F 9/3842; G06F 12/0875; G06F 12/0897; G06F 2212/452; G06F 9/467
See application file for complete search history.

(56) References Cited

U.S. PATENT DOCUMENTS 5,611,063 A    3/1997  Loper et al.
5,920,890 A    7/1999  Moyer et al.
(Continued)

FOREIGN PATENT DOCUMENTS

CN    102722341 A    12/2014

OTHER PUBLICATIONS

"Method to Exclude Bad Patterns From a Pattern History Table Branch Predictor", IBM, , IP.com 000191968, January 19, 2010, 5 Pages.

(Continued)

*Primary Examiner* — Benjamin P Geib
*Assistant Examiner* — Andrew J Cromer
(74) *Attorney, Agent, or Firm* — Nathan Rau; Amy J. Pattillo

(57) ABSTRACT

Within a processor, speculative finishes of load instructions only are tracked in a speculative finish table by maintaining an oldest load instruction of a thread in the speculative finish table after data is loaded for the oldest load instruction, wherein a particular queue index tag assigned to the oldest load instruction by an execution unit points to a particular entry in the speculative finish table, wherein the oldest load instruction is waiting to be finished dependent upon an error check code result. Responsive to a flow unit receiving the
(Continued)

particular queue index tag with an indicator that the error check code result for data retrieved for the oldest load instruction is good, finishing the oldest load instruction in the particular entry pointed to by the queue index tag and writing an instruction tag stored in the entry for the oldest load instruction out of the speculative finish table for completion.

7 Claims, 7 Drawing Sheets

(51) Int. Cl.
    *G06F 12/0875*     (2016.01)
    *G06F 12/0897*     (2016.01)

(52) U.S. Cl.
    CPC ........ *G06F 9/3842* (2013.01); *G06F 12/0875* (2013.01); *G06F 12/0897* (2013.01); *G06F 2212/452* (2013.01)

(56) References Cited

U.S. PATENT DOCUMENTS

| | | | |
|---|---|---|---|
| 6,134,645 A | 10/2000 | Nguyen | |
| 6,275,918 B1 | 8/2001 | Burky et al. | |
| 6,446,029 B1 | 9/2002 | Davidson et al. | |
| 6,553,480 B1 * | 4/2003 | Cheong | G06F 9/3836 712/23 |
| 7,188,232 B1 | 3/2007 | Choquette | |
| 7,237,094 B2 | 6/2007 | Curran et al. | |
| 7,475,226 B2 | 1/2009 | Le et al. | |
| 7,689,812 B2 | 3/2010 | Abernathy et al. | |
| 8,458,406 B2 * | 6/2013 | Biswas | G06F 12/0893 711/130 |
| 9,212,171 B2 | 12/2015 | Jaeschke | |
| 9,262,171 B2 * | 2/2016 | Golla | G06F 9/3838 |
| 9,384,002 B2 * | 7/2016 | Chadha | G06F 9/3824 |
| 9,389,867 B2 * | 7/2016 | Chadha | G06F 9/3824 |
| 2008/0162889 A1 * | 7/2008 | Cascaval | G06F 9/3834 712/216 |
| 2009/0063735 A1 * | 3/2009 | Ng | G06F 9/3824 710/54 |
| 2009/0113182 A1 * | 4/2009 | Abernathy | G06F 9/3836 712/216 |
| 2012/0198157 A1 * | 8/2012 | Abdallah | G06F 12/0875 711/118 |
| 2014/0143523 A1 | 5/2014 | Chadha et al. | |
| 2014/0143613 A1 | 5/2014 | Cargnoni et al. | |
| 2014/0304573 A1 | 10/2014 | Dodson et al. | |
| 2015/0199272 A1 * | 7/2015 | Goel | G06F 12/0815 711/133 |
| 2017/0090941 A1 | 3/2017 | Eisen et al. | |

OTHER PUBLICATIONS

"System and Method to Generated Intelligent Testcases to Validate the Speculative and Superscalar Features of the High-End Microprocessor", IP.com 000218616, June 6, 2012, 8 Pages.

"List of IBM Patents or Patent Applications Treated as Related", dated Oct. 19, 2015, 2 pages.

Final Office Action, dated Jan. 26, 2018, U.S. Appl. No. 14/869,379, filed Sep. 29, 2015, In re Eisen.

Office Action, dated Oct. 1, 2018, U.S. Appl. No. 14/869,379, filed Sep. 29, 2015, In re Eisen.

Final Office Action, dated Apr. 8, 2019, U.S. Appl. No. 14/869,379, filed Sep. 29, 2015, In re Eisen.

Office Action, dated Jun. 30, 2017, U.S. Appl. No. 14/869,379, filed Sep. 29, 2015, In re Eisen.

Notice of Allowance, dated May 15, 2019, U.S. Appl. No. 14/869,379, filed Sep. 29, 2015, In re Eisen, available via PAIR/IFW, 16 pages.

* cited by examiner

EFFICIENTLY MANAGING SPECULATIVE FINISH TRACKING AND ERROR HANDLING FOR LOAD INSTRUCTIONS

CROSS REFERENCE TO RELATED APPLICATIONS

This application is a continuation of commonly assigned U.S. patent application Ser. No. 14/869,379, filed Sep. 29, 2015, which is hereby incorporated herein by reference.

BACKGROUND

1. Technical Field

The embodiment of the invention relates generally to data processing and particularly to efficiently managing speculative finish tracking and error handling for load instructions in a processor.

2. Description of the Related Art

Within a processor that implements a multiple stage pipeline for executing instructions, speculative execution may improve instruction throughput by allowing the processor to fetch and dispatch instructions without waiting for the completion of previous instructions. Speculative execution is used to address pipeline stalls by enabling a second instruction that is data-dependent upon a first instruction to enter an execution pipeline before the first instruction has passed completely through the execution pipeline. Typically, speculative execution operates under a presumption that branches are correctly predicted. If the processor executes a speculative instruction and then a subsequent event indicates the speculative instruction should not have been executed, the processor may abandon any result produced by the speculative instruction.

BRIEF SUMMARY

In a processor with multiple cores, when a core detects a load miss from the first layer of cache, such as L1 cache, and the core sends the load instruction to a next layer of cache or external memory to get the requested data, there is latency is locating the data. Once the load data is located and returned, the error correcting code (ECC) may also be checked for the load data, which adds additional latency to the load instruction execution. There is a need for a method, system, and computer program product for efficiently managing speculative finish tracking, requiring minimal hardware resources, to hold speculative finish load instructions from being committed until the ECC of the load data is returned.

In one embodiment, a method is directed to fetching, by a processor, a plurality of instructions from an instruction cache for execution by a plurality of execution circuits. The method is directed to separately identifying, by the processor, each of the plurality of instructions dispatched to the plurality of execution circuits by a separate instruction tag stored in an instruction completion table until completion, wherein a value of each separate instruction tag indicates a relative order of each separately identified instruction in relation to the other instructions of the plurality of instructions, the plurality of execution circuits for executing the plurality of instructions, wherein at least some of the plurality of instructions are executed speculatively. The method is directed to tracking, by the processor, speculative finishes of load instructions only, from among a plurality of instructions executed in the processor, in a speculative finish table separate from the instruction completion table by maintaining a particular separate instruction tag identifying an oldest load instruction of a thread in the speculative finish table after data is loaded for the oldest load instruction, wherein a particular queue index tag assigned to the oldest load instruction by a particular execution circuit that executes the oldest load instruction from among the plurality of execution circuits points to a particular entry from among a plurality of entries in the speculative finish table, wherein the oldest load instruction is waiting to be finished dependent upon an error check code result. The method is directed to, responsive to receiving the particular queue index tag with an indicator that the error check code result for data retrieved for the oldest load instruction is good, finishing, by the processor, the oldest load instruction in the particular entry of the speculative finish table pointed to by the particular queue index tag and writing the particular separate instruction tag stored in the entry for the oldest load instruction out of the speculative finish table for completion in the instruction completion table.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
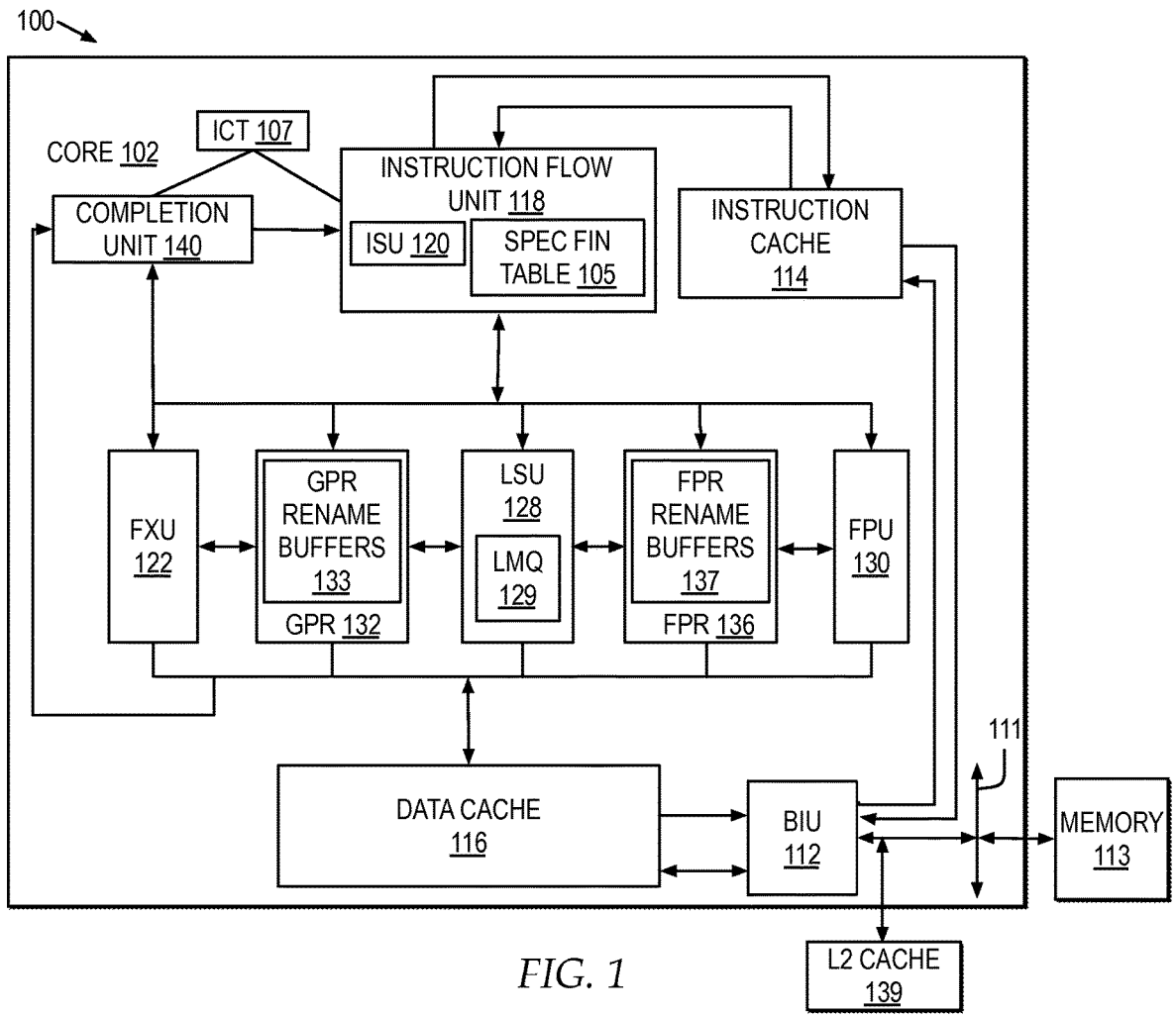
FIG. 1 illustrates one example of block diagram of a data processing system for efficiently managing speculative finishes and error handling of load instructions.

FIG. 1 illustrates a block diagram of one example of a data processing system for efficiently managing speculative finishes and error handling of load instructions. In one example, data processing system 100 represents one example of a data processing system, from among multiple possible embodiments of data processing systems. In one example, data processing system 100 may include a core 102, and may include additional or alternate cores, such as a system on chip (SOC) with an internal system fabric connecting multiple cores. In one example, an SOC represents an integrated circuit that integrates components of a computer system or electronic system into a single, integrated circuit or chip. An SOC may integrate multiple functional cores, such as multiple processor cores, which may independently process instructions and data, as described with reference to core 102, but which are integrated into a chip that functions as a single chip. Within data processing system 100, if multiple functional cores are implemented, the functional cores may share access to memory systems within data processing system 100 and external to data processing system 100.

In one example, core 102 may be coupled to a processor bus 111 via a bus interface unit (BIU) 112 within core 102. In one example, BIU 112 controls the transfer of data and instructions between core 102 and one or more devices coupled to core 102, such as one or more levels of cache and memory, such as a level 2 (L2) cache 139 and a memory 113. In one example, core 102 may implement additional or alternate bus interface units, bridges, controllers, or other units that connect BIU 112 of core 102 to one or more levels of cache and memory.

In one example, the operation of core 102 may be supported by a multi-level hierarchical memory subsystem. As illustrated, the multi-level hierarchical memory subsystem may include a highest level of cache, such as a data cache 116 and an instruction cache 116, a next level of cache, such as L2 cache 139, and a lowest level of memory, such as memory 113. In additional or alternate embodiments, the multi-level hierarchical memory subsystem may include additional or alternate levels of cache, such as L3 cache, L4 cache, and other levels of private or shared, on-chip or off-chip, in-line or lookaside cache, which may be fully inclusive, partially inclusive, or non-inclusive of the contents of upper levels of cache.

In one example, a lowest level of the multi-level hierarchical memory subsystem may include one or more shared system memories external, or off-chip, to core 102, such as, but not limited to memory 113. In one example, external system memory, such as memory 113, may represent bulk DRAM that is generally accessible by multiple functional cores, accessible via multiple channel interfaces or other types of interface controllers, and may include one or more layers of buses, buffers and other controllers.

In one example, L2 cache 139 may be accessible directly to BIU 112 through a direct memory bus connection. In one example, L2 cache 139 may represent private, store-in, cache that is private to one or more particular cores. In one example, L2 cache 139 may be integrated into a system on chip that includes core 102.

In one example, BIU 112 is connected to instruction cache 114 and a data cache 116 within core 102. Upper levels of cache, such as instruction cache 114 and data cache 116, which may also be referred to as level 1 (L1) cache, enable core 102 to achieve relatively fast access time to a subset of data or instructions stored in the L1 cache. In one example, the data or instructions stored in the L1 cache may include data and instructions previously transferred from L2 cache 139 or memory 113 to instruction cache 114 or data cache 116.

In the example illustrated, memory access latencies for core 102 are generally greatest for memory access requests serviced by the lowest levels of the multi-level hierarchical memory subsystem, such as external system memory from among memory 113. In comparison, in one example, memory access latencies for each functional core are generally lowest for memory access requests serviced by the highest levels of the multi-level hierarchical memory subsystem, such as, instruction cache 114 or data cache 116. In one example, instruction cache 114 or data cache 116 may be accessed for a memory request in a single core clock cycle, L2 cache 139 may be accessed in 3-5 core clock cycles, and external, off-chip system memory, such as memory 113, may be accessed in 300-400 core clock cycles.

In one example, instruction cache 114 is further coupled to an instruction flow unit 118, which may fetch instructions from instruction cache 114 and manage one or more pipeline stages. In one example, branch instructions fetched from instruction cache 114 are processed by branch processing circuitry internal to instruction flow unit 118. In one example, instruction flow unit 118 may include an instruction sequencing unit (ISU) 120, along with sequential execution circuitry, for fetching sequential instructions, ordering the sequential instructions for execution, and directing completion unit 140 to complete the instructions by committing the results of execution to an architected state. In one example, sequential instructions may be temporarily buffered within ISU 120 of instruction flow unit 118 until they are dispatched to execution circuitry of core 102. In one example, in order to track instructions, ISU 120 may manage an instruction completion table (ICT) 107 for storing and retrieving information about scheduled instructions. In one example, as ISU 120 dispatches an instruction, ISU 120 may update an associated entry in ICT 107 to indicate the instruction is dispatched. In one example, ISU 120 may identify each instruction or instruction group in ICT 107 by a unique instruction tag (ITAG). In one example, the value in each ITAG is sequentially incremented for each instruction, such that the value of the ITAG indicates the relative order of each instruction in relation to other instructions. In one example, if the ITAGs of two instructions are compared, the ITAG with the smaller value may be the older instruction. In another example, other numbering or tracking methods may be implemented for tracking the order of instructions. As instructions are executed, information concerning the executing instructions may be stored in fields of ICT 107 according to ITAG. In additional or alternate examples, instruction flow unit 118 may include additional circuitry for handling additional or alternate types of instructions.

In one example, the sequential execution circuitry of core 102 may include one or more execution units including, but not limited to, a fixed point unit (FXU) 122, a load-store unit (LSU) 128, and a floating-point unit (FPU) 130. In one example, each of the execution units may execute one or more instructions of a particular type of sequential instructions during each processor cycle.

For example, FXU 122 may perform integer mathematical and logical operations such as addition, subtraction, ANDing, ORing, and XORing, using integer source operands received from specified general purpose registers (GPRs) 132 or GPR rename buffers 133. Following the execution of an instruction, FXU 122 may output the resulting data, if any, to one or more GRP rename buffers 133, which provide temporary storage for the result data until the instruction is completed under the direction of completion unit 140 by transferring results from one or more GPR rename buffers 133 to one or more GPRs 132.

In another example, FPU 130 may perform arithmetic and logical operations, such as multiplication and division, on signal and double-precision floating-point source operands received from floating-point registers (FPRs) 136 or FPR rename buffers 137. FPU 130 may output data resulting from the execution of floating-point instructions to selected FPR rename buffers 137, which temporarily store the result data until the instructions are completed under the direction of completion unit 140 by transferring the result data from one or more FPR rename buffers 137 to one or more selected FPRs 136.

In one example, LSU 128 may execute floating-point and fixed-point instructions that either load data from memory, such as loading data from data cache 116, L2 cache 139, or memory 113, into one or more selected GPRs 132 or FPRs 136 or that store data from a selected one of the GPRs 132, GPR rename buffers 133, FPRs 136, or FPR rename buffers 137, to memory. In one example, data cache 116 may represent store-through level one cache from which load operations may be satisfied. LSU 128 may include a load miss queue (LMQ) that tracks load operations that miss in data cache 116, and that have to be passed to lower levels of memory.

In one example, in general, core 102 may process instructions in a sequence of pipeline stages including, but not limited to, for example, fetch, decode/dispatch, execute, finish, and completion. In one example, one or more of the execution units, such as GPR 122, LSU 128, and FPR 130 may execute instructions in any order, including speculative execution of instructions, as long as data dependencies are observed. In one example, instructions are finished and written to ICT 107 and instructions finished in ICT 107 may be eligible for completion, in order, from oldest to youngest.

In one example, when LSU 128 executes a load instruction and there is a miss for the load instruction in data cache 116, the load request is sent to one or more additional levels of the memory hierarchy and LSU 128 waits for both the load instruction data to be received from another level of memory, such as L2 cache 139 or memory 113, and for an error-correcting code (ECC) to be checked for the load instruction. In one example, one or more of the levels of memory, such as L2 cache 139 and memory 113, may represent ECC memory, which is a type of computer data storage that can detect and correct many kinds of internal data corruption. In one example, ECC memory, when implemented in a DRAM or other memory component, may include extra memory bits and memory controllers that exploit the extra bits to record an ECC. Using the ECC, the ECC memory may allow for single bit errors to be detected and corrected and may allow for multiple bit errors to be detected and corrected. In general, an ECC memory may return the load data requested by a load instruction before returning an ECC indicator indicating whether any errors are detected in the returned load data. In one example, an ECC memory may return data in packets, where each packet includes validity data, but is unqualified, and may be loaded into data cache 116, but the ECC indicator that qualifies the data is only returned with the final packet. In one example, ECC memory may significantly increase latency for load instructions due to the need for deeper error correction logic pipelines for error detection and correction. In addition, as the number of cores per chip increases and the number of interconnects between cores and connections for the cores to external memory increases, the changes for increases in bit rates increase, requiring more robust data integrity management, including more robust ECC and other data integrity management. In one example, the controller used for error detection and correction for ECC memory may be integrated within the memory unit itself, such as integrated within the physical devices of L2 cache 139 or memory 113, or may be an additional component connected to a memory unit or connected to one or more memory units via a bus connection.

In an example where LSU 128 manages out-of-order instruction execution, as LSU 128 receives load data for a load instruction from another level of memory, if there is another instruction that is dependent upon the load instruction, that dependent instruction must wait for the ECC indicator to be returned before the dependent instruction can consume the load data, otherwise significant errors could be introduced. In one example, to manage speculatively finishes of load instructions, ICT 107 may be expanded to include an additional column of data for each ITAG, in which LSU 128 may mark an entry for the ITAG as speculatively finished when the load data is returned, wherein the speculatively finished load instruction waits in ICT 107 until LSU 128 receives a good ECC indicator and can commit the returned load data to completion unit 140 for completion. In the example, while expanding ICT 107 to include an additional hardware column for maintaining the speculative finish information per completion table entry provides one way to manage load instructions during the cycles between the load data for the instruction being returned and the ECC for the load data being returned, the additional hardware required for maintaining an additional column of data values for each entry in ICT 107 may require a significant amount of physical silicon hardware space and may require hardware space that is left unused during many cycles. In addition, tracking an additional value per entry in ICT 107 for speculative finishes would also increase the power consumption for managing ICT 107. In one example, if multiple cores share ICT 107, as the number of cores increases, the number of entries in ICT 107 also increases, requiring additional hardware. For example, ICT 107 in a multi-core processor may include 512 or more entries. In addition, not every entry in ICT 107 will represent a load instruction, and even if an entry in ICT 107 is for a load instruction, not every load instruction will be in a state of speculatively finishing, therefore if speculative finishes of load instructions are tracked in ICT 107, the hardware allocated for tracking speculatively finishes for each entry will not be used each cycle.

In one example, to minimize the hardware and power resources required to allow and track speculative finishes for load instructions while waiting on an ECC indicator, without requiring ICT 107 to include hardware for tracking speculative finish information per entry, ISU 120 manages a speculative finish (SPEC FIN) table 105 for tracking speculatively finished load instructions while waiting for ECC indicators before allowing an oldest speculatively finished load instruction to be finished and written to ICT 107, to enable completion of the oldest speculative instruction and all finished younger instructions in a thread, or flushing the oldest speculatively finished load instruction, along with flushing all the younger instructions. In one example, each LSU, such as LSU 128, may include a load miss queue (LMQ) 129 that is N entries deep, for tracking load operations that miss at the local cache level, such as at data cache 116. In one example, a load operation that misses at the local cache level remains in LMQ 129 until the load data is returned for the load operation and an ECC indicator of good is returned for the load data. In one example, SPEC FIN table 105 is also N entries deep, where each entry of SPEC FIN table 105 may correspond to an entry in LMQ 129. In one example, ISU 120 determines, based on the status of a speculatively finished instruction in SPEC FIN table 105 at the time when an ECC indicator is received, whether to instruct completion unit 140 to complete an instruction by committing the load data for a speculative instruction for access by other instructions. In the example, while ICT 107 for a multi-core data processing system may include hundreds of entries, LMQ 128 and SPEC FIN table 105, in contrast, may be configured to only include less than ten entries each, such that SPEC FIN table 105 requires significantly less hardware and power to manage speculative finishes and error handling for load operations than would be required for adding an additional column of data to ICT 107 for each of the entries to track speculative finish information.

One of ordinary skill in the art will appreciate that data processing system 100 may include additional or alternate components. For example, core 102 may include one or more integrated input/output (I/O) interfaces for supporting I/O communications via one or more external communication links with one or more I/O controllers.

Figure 2:
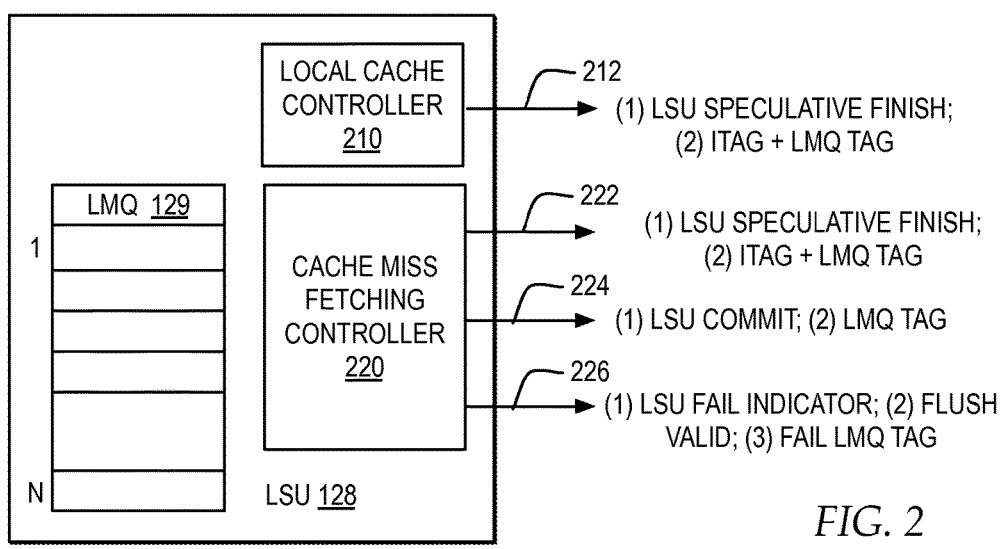
FIG. 2 illustrates one example of a block diagram of components of an LSU for efficiently managing speculative finishes and error handling for load instructions in a core.

FIG. 2 illustrates a block diagram of one example of components of an LSU for efficiently managing speculative finishes and error handling for load instructions in a core.

In one example, as illustrated, LMQ 129 is an N entry queue. In one example, each queue entry in LMQ 129 may be of a same length as the ITAG for the instructions received from ISU 120. In additional or alternate examples, each entry in LMQ 129 may include additional or alternate entry lengths, with additional information stored with each ITAG, and may include additional or alternate numbers of entries. In one example, LSU 128 may maintain one or more pointers that point to an oldest entry in LMQ 129 and a next available entry in LMQ 129. In additional or alternate embodiments, LSU 128 may maintain additional or alternate pointers for tracking information within LMQ 129.

In one example, LSU 128 may receive an instruction from ISU 120 and include logic, such as a local cache controller 210, that requests a cache lookup for the instruction from data cache 116. In one example, if local cache controller 210 receives a cache miss from data cache 116 for a cache lookup, LSU 128 may include logic to automatically send a memory access request for the instruction to a next memory layer, such as L2 cache 139. As previously noted, if there is a cache miss at L2 cache 139, the memory access request may be automatically sent to a next memory layer, such as memory 113.

In one example, LSU 128 may include a cache miss fetching controller 220 providing logic for managing speculative finishes and error handling of load operations. In one example, if cache miss fetching controller 220 detects a cache miss from data cache 116 for a load instruction received from ISU 120, cache miss fetching controller 220 may add the ITAG for the load instruction triggering the cache miss to a next open entry in LMQ 129 and add the index number of the entry in LMQ 129 as an LMQTAG for the memory access request sent to the next memory layer.

In one example, in response to LSU 128 receiving load data in response to a memory access request, cache miss fetching controller 220 may identify the index number of the entry corresponding to the returned load data in LMQ 129, access the ITAG stored in LMQ 129 at the index number, and output an LSU speculative finish signal, along with the ITAG and LMQTAG, as illustrated at reference numeral 222. In one example, cache miss fetching controller 220 may issue the LSU speculative finish (fin) signal, along with the ITAG and LMQTAG prior to receiving an ECC indicator. In the example, by issuing an LSU speculative finish signal, LSU 128 may speculatively finish a load instruction for returned load data without waiting for the ECC indicator of the load data to return from memory.

In one example, in response to LSU 128 receiving load data in response to a memory access request, the data is loaded into data cache 116. Once the data is loaded into data cache 116 in response to a first or oldest instruction, younger instructions may request to access the data prior to the ECC indicator from an ECC check being performed. If local cache controller 210 receives a cache hit with the requested data in data cache 116, local cache controller 210 may load the data into one or more registers of GPR 132 and FPR 136 and then output an LSU speculative finish signal, the ITAG of the load instruction, and the LMQ TAG for the load data, as illustrated at reference numeral 212, to ISU 120.

In one example, in response to LSU 128 receiving an ECC indicator from an ECC check from a memory access request, cache miss fetching controller 220 determines whether the ECC check is good or bad. In one example, if the ECC indicator is good, cache miss fetching controller 220 may issue an LSU commit signal, along with the LMQTAG returned in the ECC indicator, as illustrated at reference numeral 224. In one example, the LSU commit signal instructs ISU 120 to commit the load data for the speculatively finished load instruction. In one example, if the ECC indicator is bad, cache miss fetching controller 220 may issue a flush indicator and a flush valid indicator, along with the LMQTAG returned in the ECC indicator, as illustrated at reference numeral 226. In one example, cache miss fetching controller 220 may send the fail indicator and flush valid indicator with the fail indicator asserted, but the flush valid indicator not asserted or with the fail indicator asserted and the flush valid indicator also asserted. In one example, LSU 128 may assert the flush valid indicator if the LMQTAG instruction is a load instruction or other type of instruction for which flushing is set and may not assert the flush valid indicator for other types of instructions. In one example, an asserted LSU flush valid indicator signal instructs ISU 120 to flush all instructions in a thread after the oldest speculatively finished load instruction.

Figure 3:
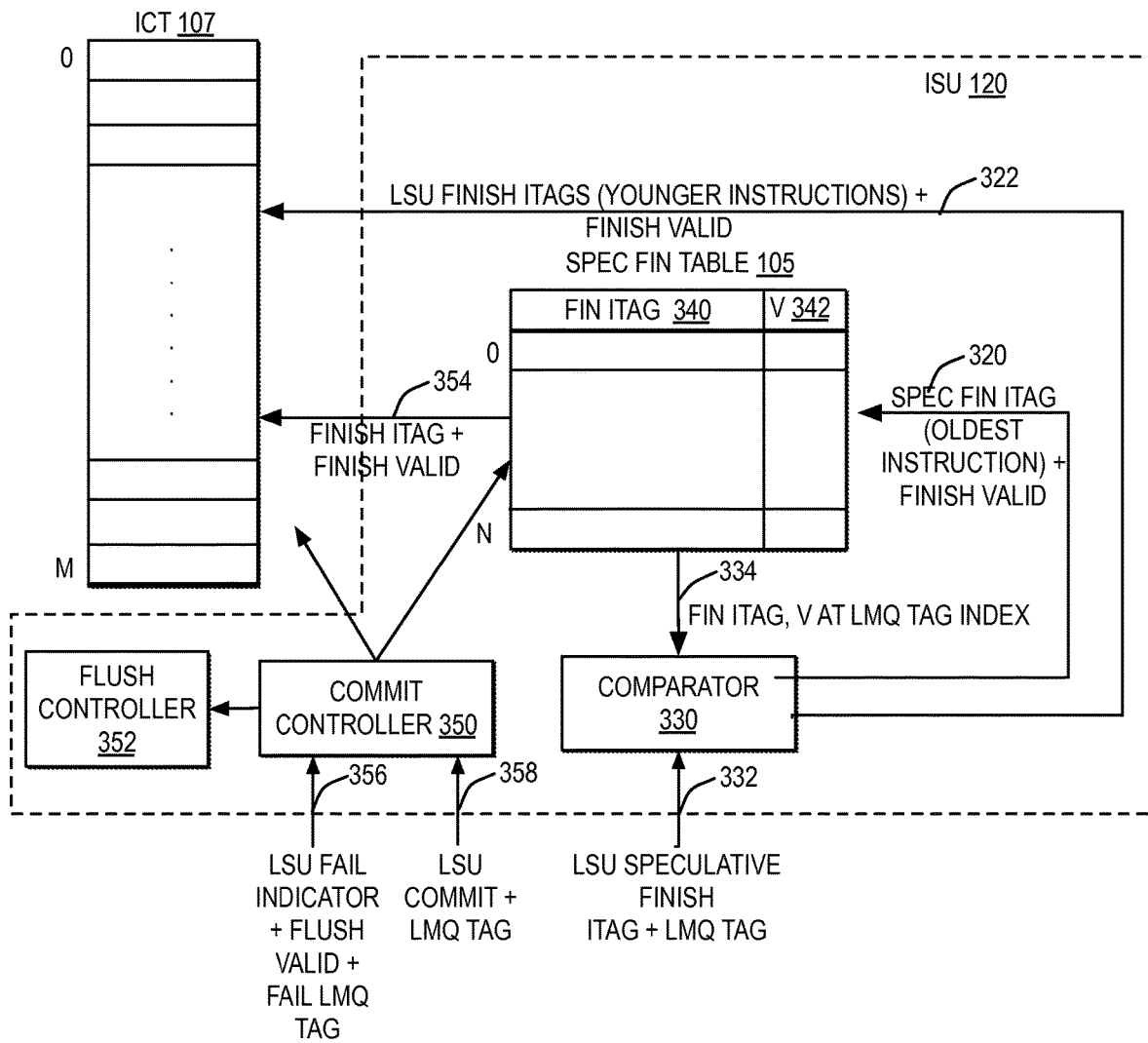
FIG. 3 illustrates one example of a block diagram of components of an LSU for efficiently managing speculative finishes and error handling of load operations in a core.

FIG. 3 illustrates a block diagram of one example of components of an LSU for efficiently managing speculative finishes and error handling of load operations in a core.

In one example, ISU 120 includes one or more logic components for managing speculatively finishes and error handling of load operations. In one example, ISU 120 may maintain an N entry table illustrated as SPEC FIN table 105 for maintaining each speculatively finished ITAG received from LSU 128, illustrated by a FIN ITAG column 340. In addition, SPEC FIN table 105 may include, for each entry in the table, a valid bit, illustrated in valid (V) column 342. In one example, each of the N entries in SPEC FIN table 105 corresponds to one or the N entries from LMQ 129. In one example, ISU 120 may receive an LMQTAG from LSU 128 and use the LMQ TAG as a pointer to an entry with an index matching the pointer in SPEC FIN table 105.

In one example, as illustrated at reference numeral 332, ISU 120 may receive, during each cycle, one or more LSU speculative finish signals, each with an ITAG and LMQ TAG. For example, ISU 120 may receive the LSU speculative finish signal with an ITAG and LMQ TAG output from LSU 128, as illustrated at reference numeral 222.

In one example, ISU 120 may include comparator logic, such as comparator 330, for determining an incoming oldest ITAG for each thread of all incoming LSU speculative finishes for each cycle. In one example, each thread may be identified by a separate LMQ TAG. In one example, during a cycle in which comparator 330 receives multiple LSU speculative finish signals, each with an ITAG and LMQ TAG, comparator 330 may compare the incoming ITAGs for each thread, based on the LMQ TAGs, and first find an oldest ITAG for each thread. Comparator 330 may select the oldest ITAG for each LMQ TAG as the incoming oldest ITAG to potentially be written into SPEC FIN table 105. In addition, when there are multiple LSU speculative finishes for a thread, comparator 330 may finish the younger ITAGs for the thread, with a finish valid signal, and write the finished ITAGs to ICT 107, as illustrated at reference numeral 322.

In one example, for an ITAG to finish within ICT 107, the finish ITAG and finish valid signals are driven to completion logic within ISU 120, which writes the finish valid signals into the entry in ICT 107 pointed to by the finish ITAG. When an ITAG is finished, with a finish valid signal, and written to ICT 107, then the ITAG is eligible to be completed, from oldest to youngest. For example, if the ITAG that is finished in ICT 107 is for the oldest speculatively finished instruction, then the instruction may be completed. In one example, if the ITAG is not the oldest speculatively finished instruction, the instruction waits in ICT 107 to be completed after the oldest speculatively finished instruction is finished in ICT 107, unless the instruction is first flushed because a bad ECC indicator is returned.

In one example, for each cycle, comparator 330 may determine, for the incoming oldest ITAG for each thread that is speculatively finished, as illustrated at reference numeral 334, a current FIN ITAG and valid bit setting for a table entry in SPEC FIN table 105 that is pointed to by the LMQ TAG index value received with the incoming oldest ITAG. Next, if the valid bit setting for the identified entry is invalid, comparator 330 selects to write the incoming oldest ITAG into the table entry in SPEC FIN table 105 pointed to by the LMQ TAG index value and set the table entry to a valid state, as illustrated at reference numeral 320. If the valid bit setting for the identified entry is valid, comparator 330 determines whether the incoming oldest ITAG is younger than the FIN ITAG in the entry in SPEC FIN table 105 pointed to by the LMQ TAG. If the incoming oldest ITAG is younger than the FIN ITAG in the entry in SPEC FIN table 105, then comparator 330 selects not to write the incoming oldest ITAG into SPEC FIN table 105 and comparator 330 selects to finish the incoming oldest ITAG and write the incoming oldest ITAG to ICT 107, as illustrated at reference numeral 322. If the incoming oldest ITAG is older than the FIN ITAG in the entry in SPEC FIN table 105, then comparator 330 selects to read out the younger FIN ITAG from the entry in SPEC FIN table 105 pointed to by the LMQ TAG, finish the read out younger FIN ITAG with a finish valid signal, and write the younger incoming FIN ITAG to ICT 107, as illustrated at reference numeral 354. In addition, if the incoming oldest ITAG is older than the FIN ITAG in the entry in SPEC FIN table 105, then comparator 330 selects to write the incoming oldest ITAG into the entry in SPEC FIN table 105 pointed to by the LMQ TAG, as illustrated at reference numeral 320, and sets the valid bit for the entry to a valid state.

In one example, ISU 120 may also include logic, such as commit controller 350, to manage incoming ECC related responses from LSU 128. As described with reference to FIG. 2, cache miss fetching controller 220 of LSU 128 may issue an LSU commit signal with an LMQ TAG for an ECC indicator that is good, as illustrated at reference numeral 224, and may issue an LSU fail indicator, flush valid indicator, and fail LMQ TAG for an ECC indicator that is bad, as illustrated at reference numeral 226.

In one example, if commit controller 350 receives an LSU commit signal with an LMQ TAG, as illustrated at reference numeral 358, indicating an ECC indicator was good, commit controller 350 selects to look up the table entry in SPEC FIN table 105 pointed to by the LMQ TAG received with the LSU commit signal, finish the FIN ITAG accessed from the table entry, and write the FIN ITAG to ICT 107 as a finish ITAG, as illustrated by finish ITAG 354 with a finish valid signal set. In one example, commit controller 350, comparator 330, and other functions of ISU 120 may use the same logic to look up entries in SPEC FIN table 105 using the LMQ TAG as an index, finish the ITAG in the entry pointed to by the LMQ TAG, and write the finished ITAG to ICT 107. In the example, effectively, when FIN TAG is finished with a finish valid signal and written to ICT 107 in response to the LSU commit signal, the FIN ITAG is the oldest speculatively finished instruction written to ICT 107. Once the oldest speculatively finished instruction is finished and written to ICT 107, it is eligible to be completed, along with the younger speculatively finished instructions waiting in ICT 107, from oldest to youngest.

In one example, if commit controller 350 receives an LSU fail indicator, flush valid indicator and fail LMQ TAG, as illustrated at reference numeral 356, then commit controller 350 may determine whether the fail indicator is asserted, but the flush valid indicator is not asserted. In one example, if commit controller 350 determines that the fail indicator is asserted but the flush valid indicator is not asserted, then commit controller 350 may look up the table entry in SPEC FIN table 105 pointed to by the LMQ TAG and set the valid bit for only the particular table entry to an invalid state, without finishing the FIN ITAG in the table entry in SPEC FIN table 105 pointed to by the LMQ TAG. In one example, if commit controller 350 determines that the fail indicator is asserted and the flush valid indicator is asserted, then commit controller 350 may read the FIN ITAG from the table entry in SPEC FIN table 105 pointed to by the LMQ TAG, set the valid bit for the table entry to invalid, and send the read out FIN ITAG to a flush controller 352, without finishing the read out ITAG. Flush controller 352 provides logic for controlling flushing of the read out FIN ITAG and for flushing all instructions after the read out ITAG from the fetch, dispatch, issue, execution and completion pipelines, including SPEC FIN table 105 entries and ICT 107 entries. By flushing all the instructions after the read out ITAG, flush controller 352 effectively flushes out all the instructions using the loaded data that has errors.

In one example, by managing speculative finishes and error handling for load instructions in ISU 120, using SPEC FIN table 105, ICT 107 does not need additional hardware for managing data added to each entry to indicate whether an instruction is a speculative finish load instruction for which an ECC indicator has not yet been received. In the example, SPEC FIN table 105 requires minimal additional hardware within ISU 120 to maintain an N entry table, where N may be the same number of entries in LMQ 129.

Figure 4:
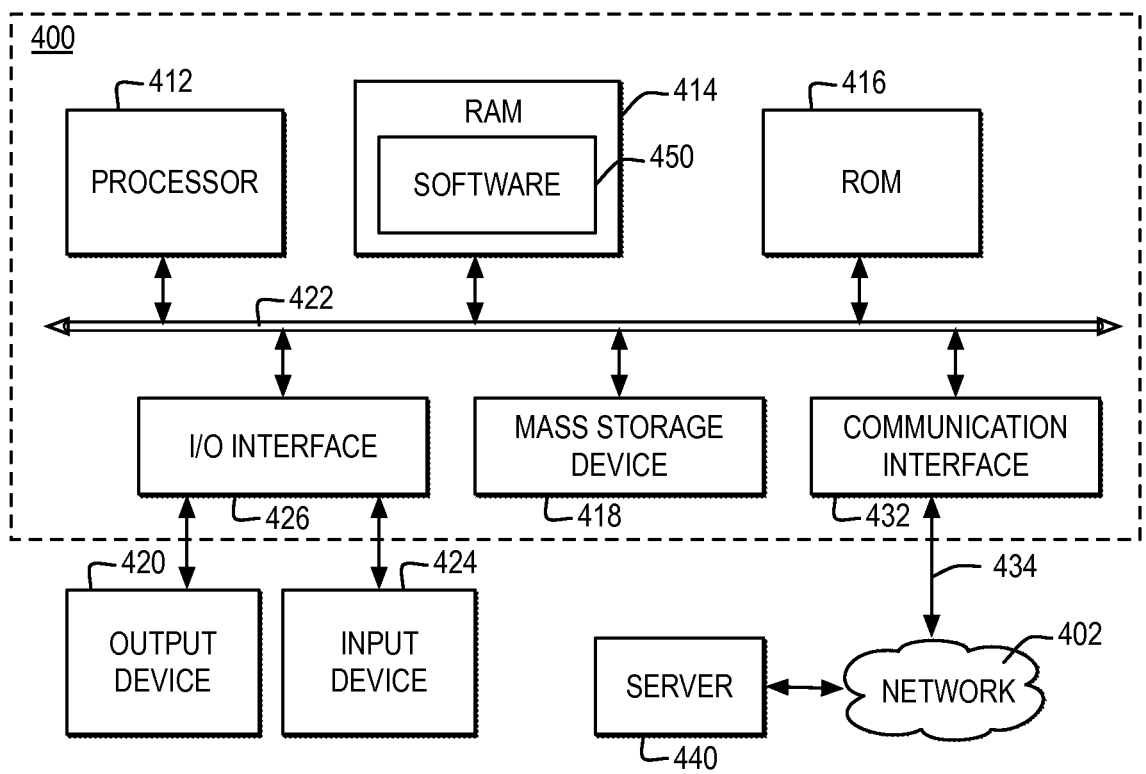
FIG. 4 illustrates one example of a block diagram of a computer system in which one embodiment of the invention may be implemented.

FIG. 4 illustrates a block diagram of one example of a computer system in which one embodiment of the invention may be implemented. The present invention may be performed in a variety of systems and combinations of systems, made up of functional components, such as the functional components described with reference to a computer system 400 and may be communicatively connected to a network, such as network 402.

Computer system 400 includes a bus 422 or other communication device for communicating information within computer system 400, and at least one hardware processing device, such as processor 412, coupled to bus 422 for processing information. Bus 422 preferably includes low-latency and higher latency paths that are connected by bridges and adapters and controlled within computer system 400 by multiple bus controllers. When implemented as a server or node, computer system 400 may include multiple processors designed to improve network servicing power.

Processor 412 may be at least one general-purpose processor that, during normal operation, processes data under the control of software 450, which may include at least one of application software, an operating system, middleware, and other code and computer executable programs accessible from a dynamic storage device such as random access memory (RAM) 414, a static storage device such as Read Only Memory (ROM) 416, a data storage device, such as mass storage device 418, or other data storage medium. Software 450 may include, but is not limited to, code, applications, protocols, interfaces, and processes for controlling one or more systems within a network including, but not limited to, an adapter, a switch, a server, a cluster system, and a grid environment.

Computer system 400 may communicate with a remote computer, such as server 440, or a remote client. In one example, server 440 may be connected to computer system 400 through any type of network, such as network 402, through a communication interface, such as network interface 432, or over a network link that may be connected, for example, to network 402.

In the example, multiple systems within a network environment may be communicatively connected via network 402, which is the medium used to provide communications links between various devices and computer systems communicatively connected. Network 402 may include permanent connections such as wire or fiber optics cables and temporary connections made through telephone connections and wireless transmission connections, for example, and may include routers, switches, gateways and other hardware to enable a communication channel between the systems connected via network 402. Network 402 may represent one or more of packet-switching based networks, telephony based networks, broadcast television networks, local area and wide area networks, public networks, and restricted networks.

Network 402 and the systems communicatively connected to computer 400 via network 402 may implement one or more layers of one or more types of network protocol stacks which may include one or more of a physical layer, a link layer, a network layer, a transport layer, a presentation layer, and an application layer. For example, network 402 may implement one or more of the Transmission Control Protocol/Internet Protocol (TCP/IP) protocol stack or an Open Systems Interconnection (OSI) protocol stack. In addition, for example, network 402 may represent the worldwide collection of networks and gateways that use the TCP/IP suite of protocols to communicate with one another. Network 402 may implement a secure HTTP protocol layer or other security protocol for securing communications between systems.

In the example, network interface 432 includes an adapter 434 for connecting computer system 400 to network 402 through a link and for communicatively connecting computer system 400 to server 440 or other computing systems via network 402. Although not depicted, network interface 432 may include additional software, such as device drivers, additional hardware and other controllers that enable communication. When implemented as a server, computer system 400 may include multiple communication interfaces accessible via multiple peripheral component interconnect (PCI) bus bridges connected to an input/output controller, for example. In this manner, computer system 400 allows connections to multiple clients via multiple separate ports and each port may also support multiple connections to multiple clients.

In one embodiment, the operations performed by processor 412 may control the operations of flowchart of FIGS. 5-11 and other operations described herein. Operations performed by processor 412 may be requested by software 450 or other code or the steps of one embodiment of the invention might be performed by specific hardware components that contain hardwired logic for performing the steps, or by any combination of programmed computer components and custom hardware components. In one embodiment, one or more components of computer system 400, or other components, which may be integrated into one or more components of computer system 400, may contain hardwired logic for performing the operations of flowcharts in FIGS. 5-11.

In addition, computer system 400 may include multiple peripheral components that facilitate input and output. These peripheral components are connected to multiple controllers, adapters, and expansion slots, such as input/output (I/O) interface 426, coupled to one of the multiple levels of bus 422. For example, input device 424 may include, for example, a microphone, a video capture device, an image scanning system, a keyboard, a mouse, or other input peripheral device, communicatively enabled on bus 422 via I/O interface 426 controlling inputs. In addition, for example, output device 420 communicatively enabled on bus 422 via I/O interface 426 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 4, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 4 may vary. Furthermore, those of ordinary skill in the art will appreciate that the depicted example is not meant to imply architectural limitations with respect to the present invention.

Figure 5:
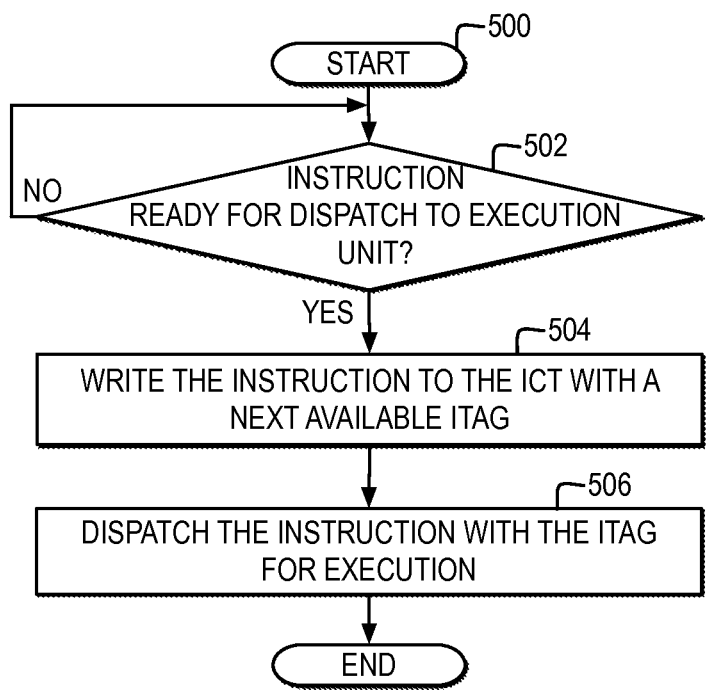
FIG. 5 illustrates one example of a high level logic flowchart of a process and computer program for tracking dispatched instructions, prior to completion, in an instruction completion table.

FIG. 5 illustrates a high level logic flowchart of a process and computer program for tracking dispatched instructions, prior to completion, in an instruction completion table.

In one example, a process and computer program starts at block 500 and thereafter proceeds to block 502. Block 502 illustrates a determination, by an instruction flow unit, whether an instruction is ready for dispatch to an execution unit. At block 502, if an instruction is ready for dispatch to an execution unit, then the process passes to block 504. Block 504 illustrates writing the instruction to the ICT with a next available ITAG. Next, block 506 illustrates dispatching the instruction with the ITAG for execution, and the process ends. Those of ordinary skill in the art will appreciate that the instruction flow unit may perform additional or alternate steps to assign an ITAG to an instruction, add the instruction to an ICT and dispatch the instruction to an execution unit.

Figure 6:
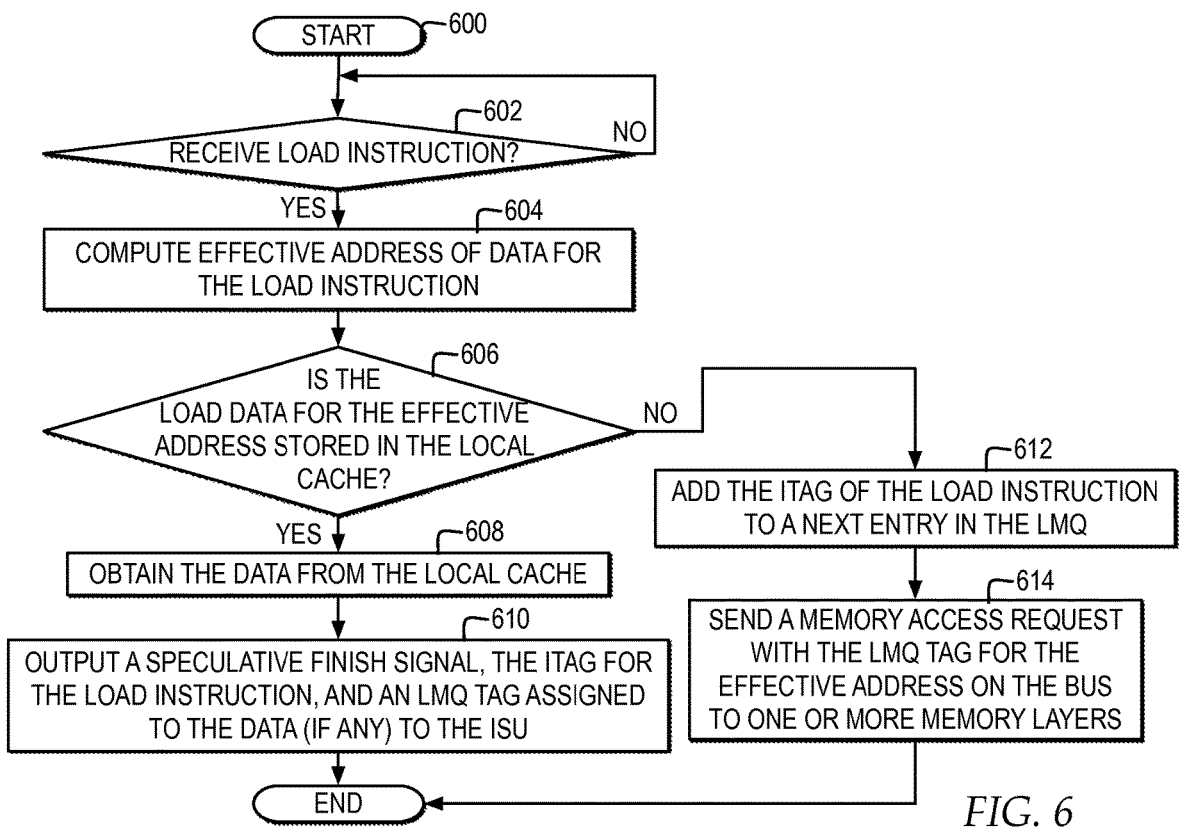
FIG. 6 illustrates one example of a high level logic flowchart of a process and computer program for managing received load instruction by an LSU.

FIG. 6 illustrates a high level logic flowchart of a process and computer program for managing received load instruction by an LSU.

In one example, a process and computer program starts at block 600 and thereafter proceeds to block 602. Block 602 illustrates a determination whether a load instruction is received by an LSU. If a load instruction is received by the LSU, then the process passes to block 604. Block 604 illustrates computing an effective address of data for the load instruction. Next, block 606 illustrates a determination whether the load data for the effective address is stored in the local data cache.

At block 606, if the load data for the effective address is stored in the local data cache, then the process passes to block 608. Block 608 illustrates obtaining the data from the local cache. Next, block 610 illustrates outputting a speculative finish signal, the ITAG for the load instruction, and the LMQ TAG assigned to the loaded data (if any) to the ISU, and the process ends.

At block 606, if the load data for the effective address is not stored in the local data cache, then the process passes to block 612. Block 612 illustrates adding the ITAG for the load instruction to a next entry in the LMQ. Next, block 614 illustrates sending a memory access request with an LMQ TAG, identifying the LMQ entry index, for the effective address on the bus to the one or more memory layers, and the process ends. Alternatively, the LSU may send the memory access request with an ITAG identifier in place of the LMQ TAG or in addition to the LMQ TAG.

Figure 7:
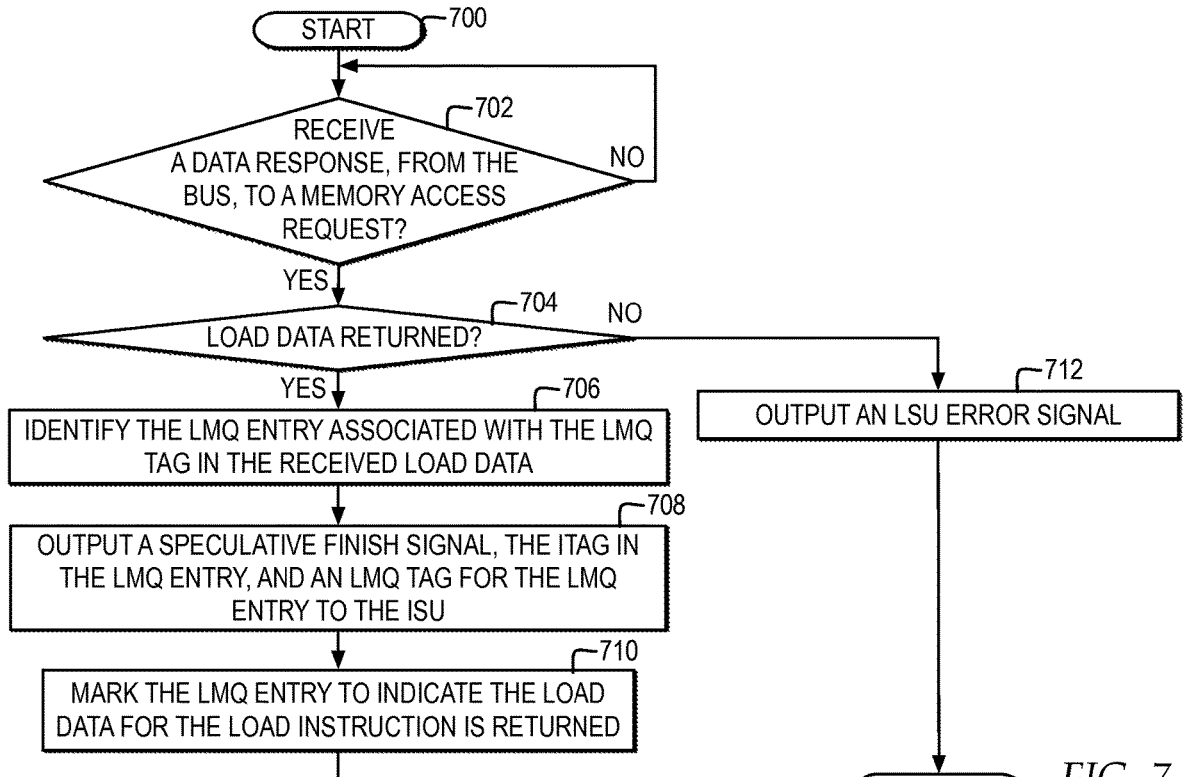
FIG. 7 illustrates one example of a high level logic flowchart of a process and computer program for managing data responses, from the bus, to a load data request.

FIG. 7 illustrates a high level logic flowchart of a process and computer program for managing data responses, from the bus, to a load data request.

In one example, a process and computer program starts at block 700 and thereafter proceeds to block 702. Block 702 illustrates a determination whether an LSU receives a data response, from the bus, to a memory access request by the LSU. At block 702, if an LSU receives a data response, from the bus, to a memory access request by the LSU, then the process passes to block 704. Block 704 illustrates a determination whether the data response indicates that the load data is returned. At block 704, if the data response indicates the load data is not returned, then the process passes to block 712. Block 712 illustrates outputting and LSU error signal, and the process ends. Returning to block 704, if the data response indicates the load data is returned, then the process passes to block 706. Block 706 illustrates identifying the LMQ entry associated with the LMQ TAG, or ITAG, in the received load data. Next, block 708 illustrates outputting a speculative finish signal, the ITAG, and an LMQ TAG for the LMQ entry to the ISU. Thereafter, block 710 illustrates marking the LMQ entry to indicate the load data for the load instruction is returned, and the process ends. In one example, an cache miss fetching controller of the LSU may mark the LMQ entry to indicate the load data for the load instruction is returned by adjusting a pointer to indicate that the LMQ entry is no longer pending or valid. In another example, an cache miss fetching controller of the LSU may wait for multiple data responses for a particular LMQ entry, where for each data response, the LMQ entry is marked, until all the expected data responses for the LMQ entry are received.

Figure 8:
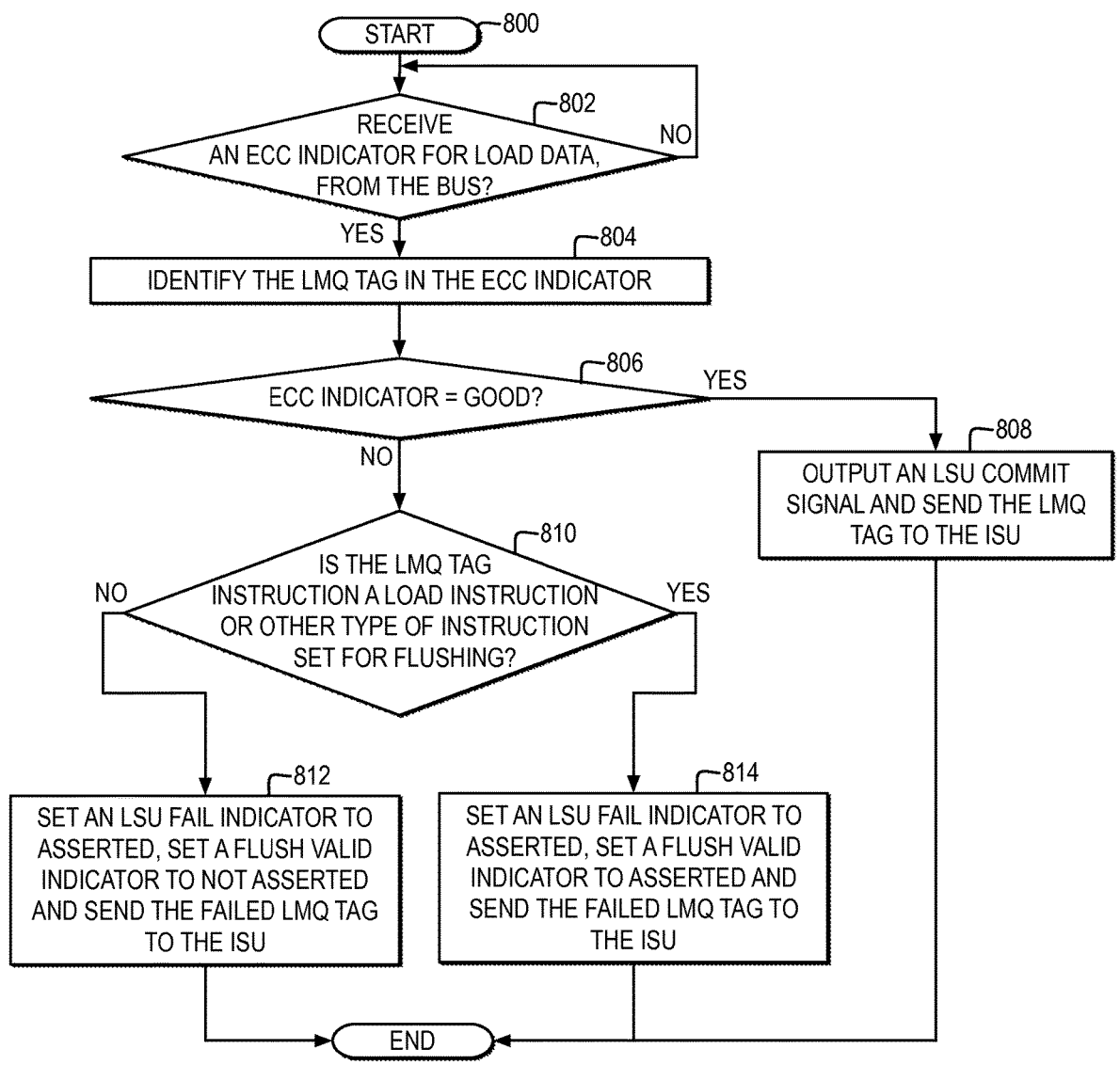
FIG. 8 illustrates one example of a high level logic flowchart of a process and computer program for managing ECC indicators received from the bus for a load data request.

FIG. 8 illustrates a high level logic flowchart of a process and computer program for managing ECC indicators received from the bus for a load data request.

In one example, the process and computer program starts at block 800 and thereafter proceeds to block 802. Block 802 illustrates a determination whether an ECC indicator is received for the load data from the bus. At block 802, if an ECC indicator is received for the load data from the bus, then the process passes to block 804. Block 804 illustrates identifying the LMQ TAG in the ECC indicator. Next, block 806 illustrates a determination whether the ECC indicator is set to good.

At block 806, if the ECC indicator is set to good, then the process passes to block 808. Block 808 illustrates outputting an LSU commit signal and sending the LMQ TAG to the ISU, and the process ends.

Returning to block 806, at block 806, if the ECC indicator is not set to good, then the process passes to block 810. Block 810 illustrates a determination LMQ TAG instruction is a load instruction or other type of instruction set for flushing. At block 810, if the LMQ TAG instruction is not a load instruction or other type of instruction set for flushing, then the process passes to block 812. Block 812 illustrates setting an LSU fail indicator to asserted, setting a flush valid indicator to not asserted, and sending the failed LMQ TAG to the ISU, and the process ends. Returning to block 810, if the LMQ TAG instruction is a load instruction or other type of instruction set for flushing, then the process passes to block 814. Block 814 illustrates setting an LSU fail indicator to asserted, setting a flush valid indicator to asserted, and sending the failed LMQ TAG to the ISU, and the process ends.

Figure 9:
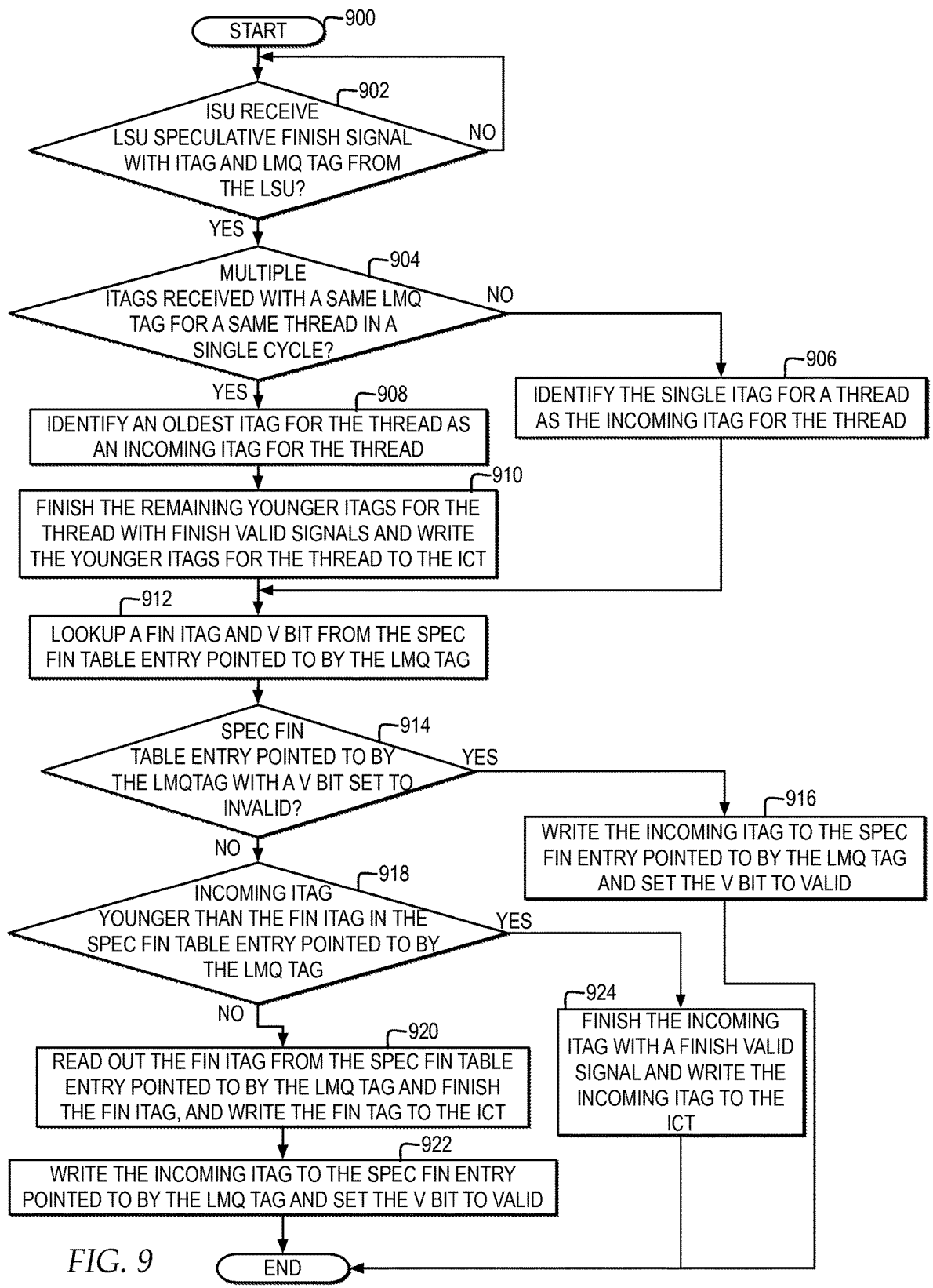
FIG. 9 illustrates one example of a high level logic flowchart of a process and computer program for managing speculative finishes of load instructions in an instruction flow unit.

FIG. 9 illustrates a high level logic flowchart of a process and computer program for managing speculative finishes of load instructions in an ISU.

In one example, a process and computer program starts at block 900 and thereafter proceeds to block 902. Block 902 illustrates a determination whether an ISU receives an LSU speculative finish signal with an ITAG and LMQ TAG from an LSU. At block 902, if the ISU receives an LSU speculative finish signal with an ITAG and LMQ TAG from an LSU, then the process passes to block 904.

Block 904 illustrates a determination whether multiple ITAGs are received with a same LMQ TAG for a same thread in a single cycle. At block 904, if multiple ITAGs are received with a same LMQ TAG for a same thread in a single cycle, then the process passes to block 908. Block 908 illustrates identifying an oldest ITAG for the thread as an incoming ITAG for the thread. Next, block 910 illustrates finishing the remaining younger ITAGs for the thread with finish valid signals and writing the younger ITAGS for the thread to the ICT, and the process passes to block 912.

Returning to block 904, at block 904, if multiple ITAGs are not received with a same LMQ TAG for a same thread in a single cycle, then the process passes to block 906. Block 906 illustrates identifying the single ITAG for a thread as the incoming ITAG for the thread, and the process passes to block 912.

Block 912 illustrates looking up a FIN ITAG and V bit setting from the SPEC FIN table entry pointed to by the LMQ TAG. Next, block 914 illustrates a determination whether the SPEC FIN table entry pointed to by the LMQ TAG includes a V bit set to invalid. At block 914, if the SPEC FIN table entry pointed to by the LMQ TAG includes a V bit set to invalid, then the process passes to block 916.

Block 916 illustrates writing the incoming ITAG to the SPEC FIN entry pointed to by the LMQ TAG and setting the V bit to valid, and the process ends. Returning to block 914, at block 914, if the SPEC FIN table entry pointed to by the LMQ TAG does not include a V bit set to invalid, then the process passes to block 918.

Block 918 illustrates a determination whether the incoming ITAG is younger than the FIN ITAG in the SPEC FIN table entry pointed to by the LMQ TAG. At block 918, if the incoming ITAG is younger than the FIN ITAG in the SPEC FIN table entry pointed to by the LMQ TAG, then the process passes to block 924. Block 924 illustrates finishing the incoming ITAG with a finish valid signal and writing the incoming ITAG to the ICT, and the process ends. Returning to block 918, if the incoming ITAG is not younger than the FIN ITAG in the SPEC FIN table entry pointed to by the LMQ TAG, then the process passes to block 920. Block 920 illustrates reading out the FIN ITAG from the SPEC FIN table entry pointed to by the LMQ TAG, finishing the FIN ITAG, and writing the FIN ITAG to the ICT. Next, block 922 illustrates writing the incoming ITAG to the SPEC FIN entry pointed to by the LMQ TAG and setting the V bit to valid, and the process ends.

Figure 10:
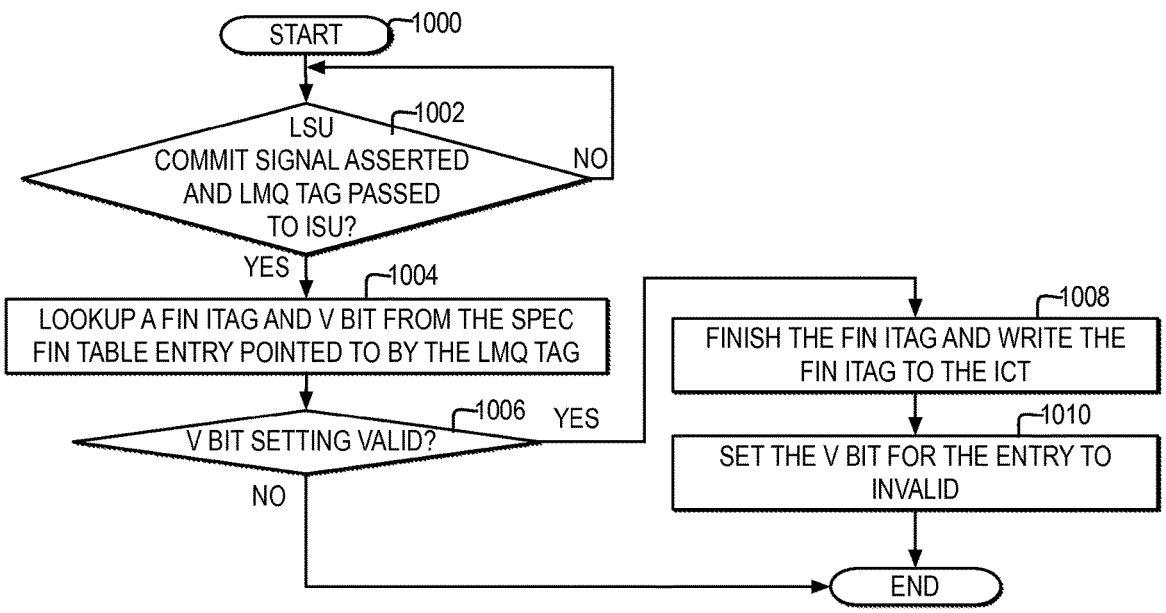
FIG. 10 illustrates one example of a high level logic flowchart of a process and computer program for managing speculative finishes and error handling of load instructions for an error indicator returned without any error.

FIG. 10 illustrates a high level logic flowchart of a process and computer program for managing speculative finishes and error handling of load instructions for an error indicator returned without any error.

In one example, the process and computer program starts at block 1000 and thereafter proceeds to block 1002. Block 1002 illustrates a determination whether an LSU commit signal is asserted and an LMQ TAG passed to the ISU. In the example, the ISU asserts an LSU commit signal and passes an LMQ TAG to the ISU when an ECC indicator set to good is received by the ISU. At block 1002, when an LSU commit signal is asserted and an LMQ TAG passed to the ISU, the process passes to block 1004. Block 1004 illustrates looking up a FIN ITAG and V bit from the SPEC FIN table entry pointed to by the LMQ TAG. Next, block 1006 illustrates a determination whether a V bit setting is valid. At block 1006, if a V bit setting is not valid, then the process ends. At block 1006, if a V bit setting is valid, then the process passes to block 1008. Block 1008 finishing the FIN ITAG and writing the FIN ITAG to the ICT. Next, block 1010 illustrates setting the V bit setting for the entry to invalid, and the process ends.

Figure 11:
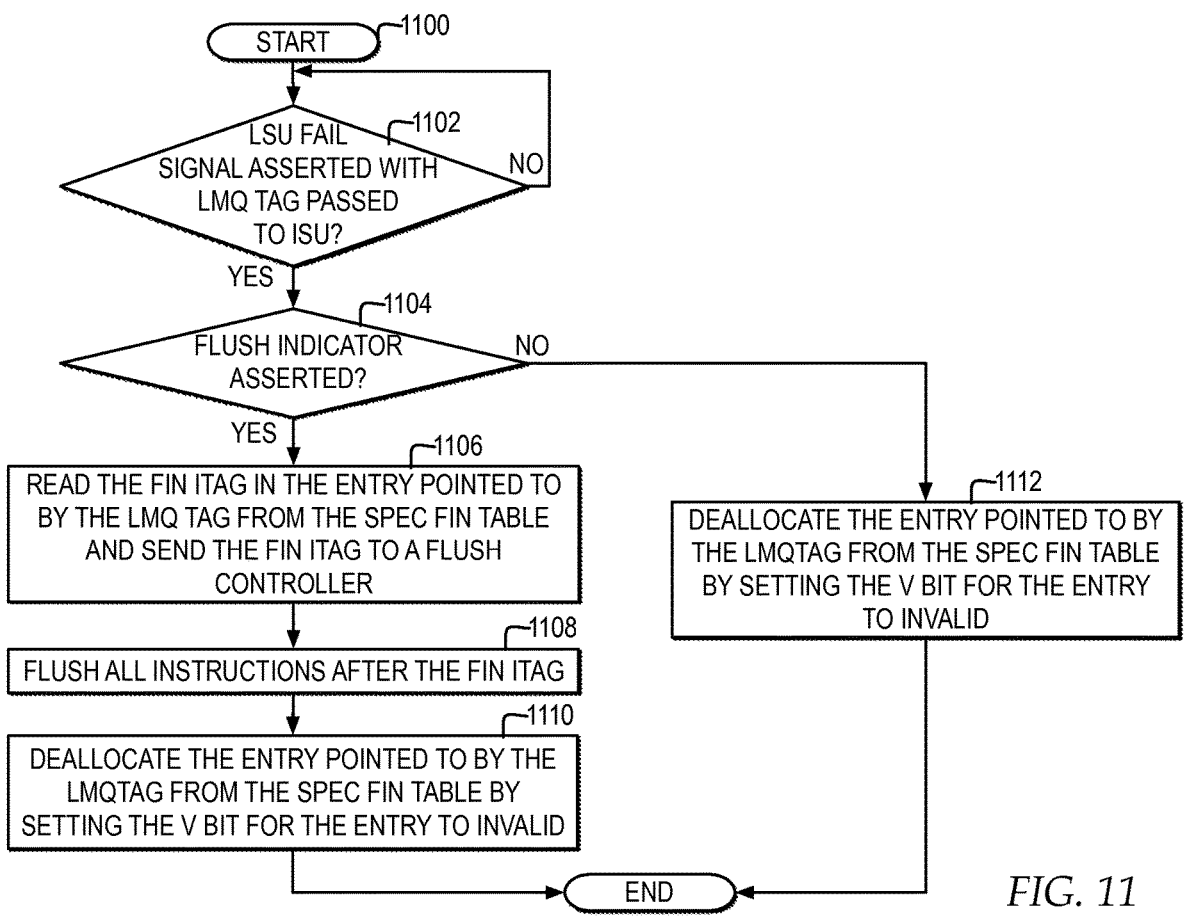
FIG. 11 illustrates one example of a high level logic flowchart of a process and computer program for managing speculative finishes and error handling of load instructions for an error indicator returned with an error.

FIG. 11 illustrates a high level logic flowchart of a process and computer program for managing speculative finishes and error handling of load instructions for an error indicator returned with an error.

In one example, the process and program starts at block 1100, and thereafter proceeds to block 1102. Block 1102 illustrates a determination whether an LSU fail signal is asserted by the LSU, with an LMQ TAG passed to the ISU. In the example, the ISU asserts an LSU fail signal and passes an LMQ TAG to the ISU when an ECC indicator set to bad is received by the ISU. At block 1102, when an LSU fail indicator is asserted by the LSU, with an LMQ TAG passed to the ISU, the process passes to block 1104.

Block 1104 illustrates a determination whether a flush indicator is asserted. At block 1104, if the flush indicator is asserted, the process passes to block 1106. Block 1106 illustrates reading the FIN ITAG in the entry pointed to by the LMQ TAG from the SPEC FIN table and sending the FIN ITAG to a flush controller to flush the ITAG. Next, block 1108 illustrates flushing all the instructions after the FIN ITAG. Next, block 1110 illustrates deallocating the entry pointed to by the LMQ TAG from the SPEC FIN table by setting the V bit for the entry to invalid, and the process ends.

Returning to block 1104, at block 1104, if the flush indicator is asserted, the process passes to block 1112. Block 1112 illustrates deallocating the entry pointed to by the LMQ TAG from the SPEC FIN table by setting the V bit for the entry to invalid, and the process ends.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method, comprising:
   fetching, by a processor, a plurality of instructions from an instruction cache for execution by a plurality of execution circuits;
   separately identifying, by the processor, each of the plurality of instructions dispatched to the plurality of execution circuits by a separate instruction tag stored in an instruction completion table until completion, wherein a value of each separate instruction tag indicates a relative order of each separately identified instruction in relation to the other instructions of the plurality of instructions, the plurality of execution circuits for executing the plurality of instructions, wherein at least some of the plurality of instructions are executed speculatively;
   tracking, by the processor, speculative finishes of load instructions only, from among a plurality of instructions executed in the processor, in a speculative finish table separate from the instruction completion table by maintaining a particular separate instruction tag identifying an oldest load instruction of a thread in the speculative finish table after data is loaded for the oldest load instruction, wherein a particular queue index tag assigned to the oldest load instruction by a particular execution circuit that executes the oldest load instruction from among the plurality of execution circuits points to a particular entry from among a plurality of entries in the speculative finish table, wherein the oldest load instruction is waiting to be finished dependent upon an error check code result; and responsive to receiving the particular queue index tag with an indicator that the error check code result for data retrieved for the oldest load instruction is good, finishing, by the processor, the oldest load instruction in the particular entry of the speculative finish table pointed to by the particular queue index tag and writing the particular separate instruction tag stored in the entry for the oldest load instruction out of the speculative finish table for completion in the instruction completion table.

2. The method according to claim 1, wherein tracking speculative finishes of load instructions only, from among a plurality of instructions executed in a processor, in a speculative finish table by maintaining an oldest load instruction of a thread in the speculative finish table after data is loaded for the oldest load instruction, further comprises:

receiving, by an instruction flow circuit, a speculative finish signal asserted by the particular execution circuit with an incoming instruction tag and the particular queue index tag for a particular load instruction from among a plurality of instructions, the speculative finish signal indicating the data requested by the particular load instruction was retrieved into local cache from a lower level of cache and the particular execution circuit is waiting to receive an error correction indicator for the data;

looking up, by the instruction flow circuit, a table instruction tag and a valid bit setting in the particular entry in the speculative finish table pointed to by the particular queue index tag;

responsive to the valid bit setting set to an invalid state, writing, by the instruction flow circuit, the incoming instruction tag to the particular entry and setting the valid bit setting to a valid state;

responsive to the valid bit setting set to the valid state, comparing, by the instruction flow circuit, the incoming instruction tag to the table instruction tag;

responsive to the incoming instruction tag being younger than the table instruction tag, finishing, by the instruction flow circuit, the incoming instruction tag by driving a finish valid signal and the incoming instruction tag to the instruction completion table and writing the incoming instruction tag to the instruction completion table, wherein finished instructions within the instruction completion table are eligible to complete from oldest to youngest; and responsive to the incoming instruction tag being older than the table instruction tag:

reading out, by the instruction flow circuit, the table instruction tag from the speculative finish table;

finishing, by the instruction flow circuit, the table instruction tag by driving the finish valid signal and the table instruction tag to the instruction completion table;

writing, by the instruction flow circuit, the table instruction tag to the instruction completion table; and writing, by the instruction flow circuit, the incoming instruction tag to the particular entry and setting the valid bit setting to the valid state.

3. The method according to claim 2, further comprising:

receiving, during a single cycle of the processor, by the instruction flow circuit, a selection of a plurality of instruction tags with the particular queue index tag while the speculative finish signal is asserted;

identifying, by the instruction flow circuit, from among the selection of the plurality of instruction tags, an oldest instruction tag;

setting, by the instruction flow circuit, the oldest instruction tag as an incoming instruction tag for the thread for the single cycle; and finishing, by the instruction flow circuit, a remaining selection of instruction tags from among the plurality of instruction tags for the thread and writing the remaining selection of instruction tags for the thread to the instruction completion table.

4. The method according to claim 1, wherein, responsive to receiving the particular queue index tag with an indicator that the error check code result for data retrieved for the oldest load instruction is good, finishing the oldest load instruction in the particular entry of the speculative finish table pointed to by the particular queue index tag and writing an instruction tag stored in the entry for the oldest load instruction out of the speculative finish table for completion, further comprises:

receiving, by an instruction flow circuit, the indictor that the error check code result for data retrieved for the oldest load instruction is good by receiving a commit signal from the particular execution circuit;

receiving, by the instruction flow circuit, the particular queue index tag from the particular execution circuit;

looking up, by the instruction flow circuit, a table instruction tag and a valid bit setting in the particular entry in the speculative finish table pointed to by the particular queue index tag; and responsive to the valid bit setting set to a valid state, finishing, by the instruction flow circuit, the table instruction tag by driving a finish valid signal and the table instruction tag to the instruction completion table and writing the table instruction tag to the instruction completion table.

5. The method according to claim 1, further comprising:

responsive to receiving the particular queue index tag with the indicator that the error check code result for the data retrieved for the oldest result is bad by receiving the particular queue index tag and a fail signal from the particular execution circuit, determining, by the instruction flow circuit, whether a flush indicator is asserted by the particular execution circuit;

responsive to detecting the flush indicator is not asserted, setting, by the instruction flow circuit, a valid bit setting of the particular entry pointed to by the particular queue index tag in the speculative finish table to an invalid state, to deallocate the particular entry;

responsive to detecting the flush indicator is asserted:

reading, by the instruction flow circuit, a table instruction tag for the oldest load instruction in the particular entry of the speculative finish table pointed to by the particular queue index tag and sending the table instruction tag to a flush controller;

flushing, by the instruction flow circuit, all instructions after the table instruction tag; and setting, by the instruction flow circuit, the valid bit setting of the particular entry pointed to by the particular queue index tag in the speculative finish table to the invalid state, to deallocate the particular entry.

6. The method according to claim 1, wherein responsive to receiving the particular queue index tag with an indicator that the error check code result for data retrieved for the oldest load instruction is good, finishing the oldest load instruction in the particular entry of the speculative finish table pointed to by the particular queue index tag and writing an instruction tag stored in the entry for the oldest load instruction out of the speculative finish table for completion, further comprises:

executing, by the processor, the oldest load instruction of the plurality of instructions through a pipeline comprising a plurality of execution stages comprising a dispatch stage for dispatching the oldest load instruction to the particular execution circuit, an execution stage for executing the oldest load instruction at the particular execution circuit, a finish step for finishing the oldest load instruction following an indicator that the error check code result is good, and a completion step for committing the data retrieved for the oldest load instruction to a memory.

7. The method according to claim 1, wherein writing the particular separate instruction tag stored in the entry for the oldest load instruction out of the speculative finish table for completion in the instruction completion table, further comprises:

maintaining, by an instruction flow circuit, the instruction completion table comprising a plurality of completion entries, each of the plurality of instructions dispatched in the processor by the instruction flow circuit and not yet completed tracked in the instruction completion table, the separate instruction tag from among a plurality of instruction tags assigned to each of the plurality of instructions in the plurality of the completion entries, a number of table entries in the speculative finish table less than a number of entries in the instruction completion table; and writing, by the instruction flow circuit, the particular separate instruction tag out of the speculative finish table for completion by writing the particular separate instruction tag in the instruction completion table as completed, wherein a completion circuit commits the data retrieved for the particular separate instruction tag to memory when the instruction tag is written for completion in the separate instruction completion table.

\* \* \* \* \*